United States Patent [19]

Brown

[11] Patent Number: 4,601,210
[45] Date of Patent: Jul. 22, 1986

[54] FLOWMETER WITH RADIAL VIBRATIONAL MODE FOR ULTRASONIC WAVES

[75] Inventor: Alvin E. Brown, Santa Cruz, Calif.

[73] Assignee: Manning Technologies, Inc., Scotts Valley, Calif.

[21] Appl. No.: 605,868

[22] Filed: May 1, 1984

[51] Int. Cl.$^4$ .............................................. G01F 1/66
[52] U.S. Cl. ............................... 73/861.27; 73/861.18; 310/327; 310/336
[58] Field of Search ........... 73/861.18, 861.27, 861.28, 73/597; 310/336, 326, 327, 333

[56] References Cited

U.S. PATENT DOCUMENTS

| | | |
|---|---|---|
| 3,575,050 | 4/1971 | Lynnworth ...................... 73/861.27 |
| 3,818,757 | 6/1974 | Brown . |
| 4,052,896 | 10/1977 | Lee et al. ......................... 73/861.29 |
| 4,162,111 | 7/1979 | Brown . |
| 4,203,322 | 5/1980 | Brown . |
| 4,297,607 | 10/1981 | Lynnworth et al. ........ 73/861.18 X |
| 4,383,194 | 5/1983 | Ohigashi et al. ................ 310/327 X |
| 4,505,160 | 3/1985 | Zacharias, Jr. .................. 73/861.18 |

Primary Examiner—Charles A. Ruehl

[57] ABSTRACT

An ultrasonic flowmeter of the upstream-downstream type having piezoelectric crystals operated in the radial mode, as well as the compression mode, or primarily the radial mode. If both modes are used, one of the two may be selected in order to optimize the received signal. Selection would depend upon the molecular weight and temperature of the viscous fluid in the flowmeter. The selected frequency would be below the relaxation frequency of the flowing material. Radial mode oscillations are achieved by mass loading members adhered to either side of the crystal, thereby creating acoustic impedances which dampen the compressional mode, but enhance the radial mode of vibration. The mass loading member rearward of the crystal is significantly larger than the forward member so that most of the energy to be transmitted is directed in a forward direction. The forward end of the crystal is mounted in a tubular housing which is inserted into a pipe opening into a larger pipe where fluid flow occurs.

9 Claims, 4 Drawing Figures

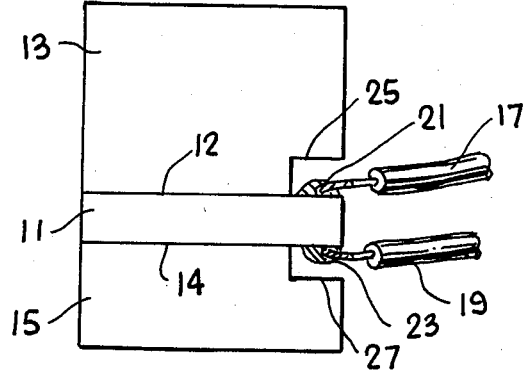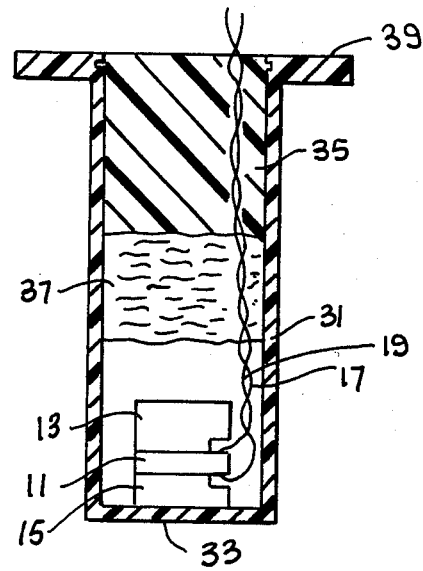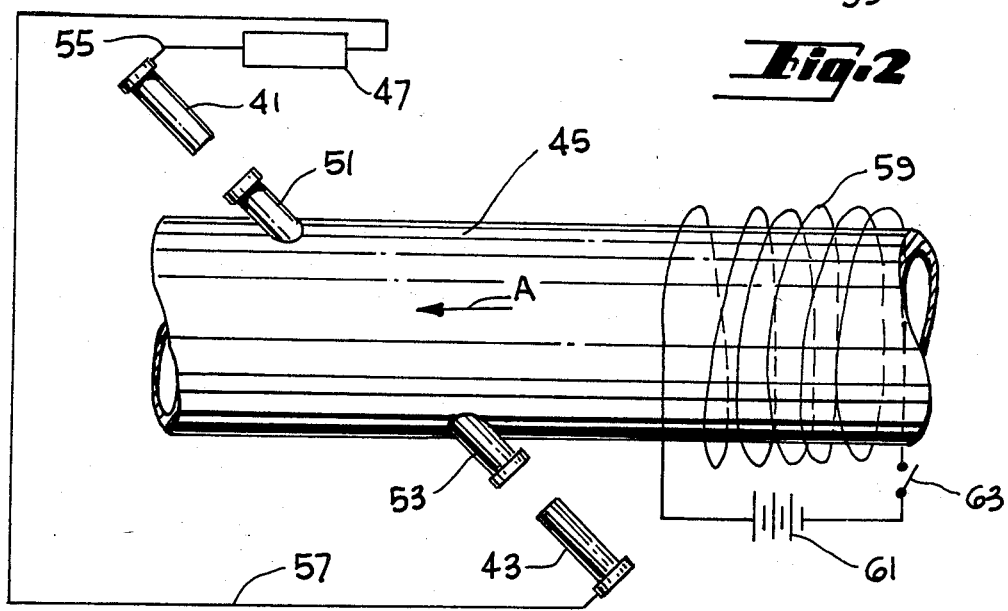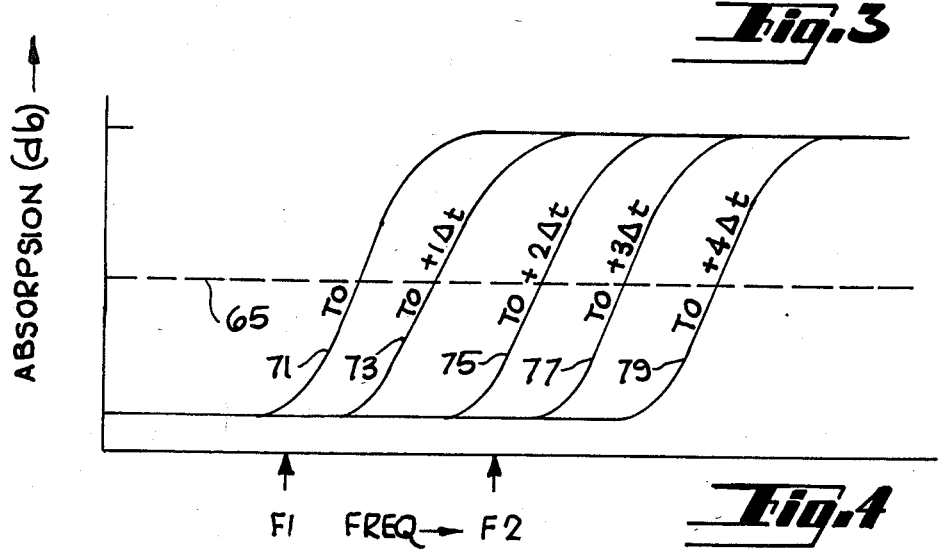

4,601,210

FLOWMETER WITH RADIAL VIBRATIONAL MODE FOR ULTRASONIC WAVES

DESCRIPTION

1. Technical Field

The invention relates to ultrasonic flowmeters and in particular to an ultrasonic flowmeter for viscous fluids such as heavy oil and crude oil.

2. Background Art

Ultrasonic flowmeters of the upstream-downstream type have been known for more than ten years. For example, U.S. Pat. No. 3,818,757 describes such a flowmeter wherein an acoustic path is defined between a pair of piezoelectric transducers disposed at an angle to the direction of fluid flow in a pipe. In such a flowmeter, one piezoelectric crystal acts as a transmitter while the other acts as a receiver and then roles are reversed. This provides upstream and downstream acoustic path measurements which can be compared in a way such that the difference in pulse counts provides a measure of fluid flow. One of the problems which is encountered in such flowmeters involves viscous fluids. Such fluids have relatively low relaxation frequencies such that the typical ultrasonic transducer frequency exceeds the relaxation frequency. Under such circumstances, it is not possible to transmit sound from one transducer to the other. Typically, ultrasonic acoustic waves are generated by piezoelectric crystals which have a disk or wafer shape. The vibrational mode of excitation is the compressional mode wherein opposed major surfaces of the disk are vibrating. While frequency may be changed by changing the thickness of the crystal, there are practical limits to the thickness which may be employed.

Since the disk shape for the crystal is ideal in transducer assemblies mounted in tubes joined to a pipe carrying the viscous fluid, it is difficult to change the crystal shape in order to obtain another vibrational frequency. However, it is well known that crystal frequency may be changed by exciting other vibrational modes.

An object of the invention was to devise a method of operating an upstream-and-downstream ultrasonic flowmeter for viscous fluids.

SUMMARY OF INVENTION

The above object has been achieved in an ultrasonic flowmeter of the upstream-downstream type by generating a radial vibrational mode, as well as a compression vibrational mode, in a transducer housing of the type used in prior flowmeters, thereby extending the usefulness of existing flowmeters. This result is achieved by adhering masses to either side of the piezoelectric crystal disk which generates acoustic waves. Such masses create an acoustic impedance so that the radial mode of vibration is preferred. The radial vibrational mode generally has a lower frequency, up to ten times lower than the compressional vibrational mode. Such a low frequency allows greater coupling of energy between transducers, well below the relaxation frequency of even the most viscous fluids, such that an upstream-downstream ultrasonic flowmeter may be used with the usual expected accuracy in viscous fluids, such as heavy oils.

BRIEF DESCRIPTION OF THE DRAWINGS

FIG. 1 is a plan view of a piezoelectric crystal with mass loading suitable for use in an ultrasonic flowmeter transducer.

FIG. 2 is a sectional view of a piezoelectric crystal assembly of the type illustrated in FIG. 1, mounted in a housing, forming a transducer assembly for an ultrasonic flowmeter.

FIG. 3 is a plan view of an ultrasonic flowmeter employing upstream-downstream transducer assemblies of the type illustrated in FIG. 2.

FIG. 4 is a plot of the relaxation frequency in a viscous fluid, showing variations in absorption of the acoustic signal versus frequency for different temperatures.

BEST MODE FOR CARRYING OUT THE INVENTION

With reference to FIG. 1, a piezoelectric crystal 11 is shown sandwiched between two mass loading members 13 and 15. Crystal 11 is a disk or wafer which is approximately the size of a U.S. dime or somewhat smaller. The typical output frequency is 1.1 mHz when used in usual configurations for ultrasonic flowmeters of the type described in U.S. Pat. No. 3,818,757. An a.c. signal applied by wires 17 and 19 electrically excites the crystal into a vibrational mode. In the prior art, this vibrational mode has been the compressional mode with acoustic waves coming from major opposed surfaces 12 and 14 of the crystal. Wires 17 and 19 are affixed to the crystal by means of solder joints 21 and 23.

While the nominal frequency of 1.1 mHz is adequate for ordinary fluids, it is inadequate for very viscous fluids, such as heavy oils. The reason for this is that the relaxation frequency of such heavy oils does not allow good transmission of acoustic waves through the medium in a flowmeter. Relaxation frequency is a function of molecular size and for viscous hydrocarbons, i.e. large molecular size, the relaxation frequency is relatively low. It is difficult to transmit acoustic waves having a frequency which is higher than the relaxation frequency of the transmission medium.

To obtain a crystal having a frequency in the compression mode below the relaxation frequency for heavy oil would be quite difficult. Such a crystal would have unusual dimensions and would be difficult and costly to obtain.

By using an ordinary crystal, but forcing oscillations in the radial mode, frequencies ten times lower than compressional mode frequencies have been obtained. This is done by mass loading of crystal 11 by means of the mass loading members 13 and 15 which are aluminum blocks. These mass loading members are selected such that the amplitude of the radial mode oscillation is equal to the amplitude of the radial mode. These mass loading members are also selected so that there is less acoustic impedance in the forward direction of transmission than in the rearward direction. Thus, mass loading member 15, facing the direction of acoustic wave transmission, is less thick than mass loading member 13. Ordinarily, the mass loading members are adhered to major surfaces of crystal 11 by means of adhesives, such as epoxy, but for high-temperature work, the members may be held in place by a spring as shown in U.S. Pat. No. 4,162,111. Note that each mass loading member has a notch 25 and 27, for accommodating a respective solder joint 21 and 23. The thickness of mass loading member 15, i.e. in the direction of acoustic wave transmission, is approximately one-fourth the wavelength of waves at the radial mode crystal frequency. The thickness of mass loading member 13 is approximately one-half the same wavelength.

FIG. 2 shows the crystal 11 with the mass loading members 13 and 15 mounted in a tubular holder 31 having a closed end 33. The closed end should be generally transparent to acoustic waves generated by crystal 11. Mass loading member 15 is adhered to closed end 33 by an adhesive or, in high temperature applications, is held in place by a spring, as previously mentioned. Wires 17 and 19 are brought through the tubular housing rearwardly and may be held in place by a potting compound 35 used to plug the rearward end of the tubular housing. A material absorptive of acoustic waves, such as cotton wad 37, may be an intermediate filler material. The potting compound is a structural adhesive, such as epoxy. The material of the housing 31 may be a polymer, such as a material sold under the trademark Ryton. The upper portion of the housing comprises an annular flange 39 which serves to mount the entire transducer assembly of FIG. 2 in a pipe which opens into a larger pipe having viscous fluid flow inside.

This is more clearly illustrated in FIG. 3 wherein the transducer assemblies 41 and 43 are shown to be suitable for mounting in corresponding pipes 51 and 53. These pipes open into the large diameter pipe 45 carrying a viscous fluid in the direction of arrow A. In an upstream-downstream ultrasonic flowmeter of the type described in U.S. Pat. No. 3,818,757, an ultrasonic acoustic signal is transmitted first from one transducer assembly toward the other which receives the signal. An example would be from transducer assembly 41 to transducer assembly 43, which is the upstream direction relative to arrow A. Once a pulse or wave train is received, the process is reversed and the signal is transmitted from transducer assembly 43 to transducer assembly 41 in the downstream direction. From these upstream and downstream transmissions, flow velocity may be determined using an apparatus of the type described in U.S. Pat. No. 4,203,322, illustrated schematically by means of measurement box 47. Signals to the measurement box are carried along wires 55 and 57 from the respective transducer assemblies 41 and 43.

Since the relaxation frequency through a viscous fluid is highly temperature dependent, a heating coil 59 may be provided for raising the temperature of the viscous fluid to bring it into the range for which the flowmeter is designed. The flowmeter can be designed for any temperature range, but sometimes a flowmeter is designed for one temperature range, typically a high range such as 200° C. and the associated process is sometimes run at a lower temperature, thus requiring heating prior to the run through the flowmeter. The heating coil 59 is typically a resistive element powered by an energy source 61 and having a switch 63 so that the coil may be disconnected when not in use.

The temperature dependence and mode of operation of a flowmeter employing the present invention may be seen with respect to FIG. 4, a plot of acoustic signal absorption versus frequency.

In FIG. 4, two frequencies F1 and F2 are shown. F1 represents the radial mode of vibration of the transducer assembly of FIG. 2, while F2 represents the compressional mode. F2 might be approximately 1.1 mHz, while F1 might be approximately 120 kHz. The curves which are plotted represent relaxation frequencies for a viscous fluid at different temperatures. The dashed line 65 represents an absorption level, above which a useful signal is not received. For example this might be a level at which 75% of the acoustic energy transmitted is not detected at the receiver. Thus, the dashed line 61 is termed a threshold level such that energy coupled into the viscous fluid must hit the curve representing relaxation frequency below the threshold level. For curve 71 labeled $T_0$ this occurs for frequency F1, but not F2. If the viscous fluid is heated by a temperature increment, $\Delta t$, the same thing occurs, as indicated by curve 73. If the fluid is heated by a temperature increment $2\Delta t$, as indicated by curve 75, $T_0 + 2\Delta t$, both frequencies F1 and F2 can couple energy into the viscous fluid. The same is true for curves 77 and 79 representing the relaxation frequency at temperatures $T_0 + 3\Delta t$ and $T_0 + 4\Delta t$, respectively. Thus, it is seen that by heating the material, there is a greater chance of transmitting both frequencies through the fluid. As the material is heated, it becomes less viscous and transmits acoustic energy more readily at higher frequencies. Depending on the temperature of the material, it is desirable to have both frequencies, F1 and F2, available for use. For this reason, the loading members attached to the crystal are such that both the compression and radial modes of vibration are excited. Both frequencies are directed into the medium. Depending on the temperature of the viscous medium, as well as the molecular size of the material involved, both frequencies may or may not be detected. At least the lower frequency, i.e. the radial mode frequency, should be detectable. For higher temperature viscous fluids, both should be detectable and filters, either mechanical or electrical, associated with the receiving transducer can select the desired signal. Alternatively, the electronics may be tuned to detect the desired signal.

While the viscous fluid described therein has been described as heavy oil or crude oil, the invention is not restricted to such materials. Other viscous fluids, such as butter or sludge may exhibit similar properties and hence be suitable for measurement by a flowmeter operated in accord with the present invention.

I claim:

1. A method of operating an ultrasonic flowmeter for viscous fluids comprising, transmitting and receiving ultrasonic acoustic waves generated by a piezoelectric crystal in upstream-downstream transducers of an ultrasonic flowmeter, said crystal having a radial vibrational mode, enhancing radial mode vibration while damping compressional mode vibration, and determining flow rate from said acoustic waves of radial vibrational mode.

2. The method of claim 1 further defined by controlling the temperature of said viscous fluid such that the relaxation frequency of the viscous fluid exceeds the frequency of said acoustic waves.

3. A method of operating an ultrasonic flowmeter for viscous fluids comprising, transmitting ultrasonic waves having a pair of spaced-apart frequencies generated by piezoelectric crystals in upstream-downstream transducers of an ultrasonic flowmeter, said flowmeter having flow of a viscous fluid, where one of said two spaced-apart frequencies is compression mode vibration in the piezoelectric crystal and the other frequency is radial mode vibration, at least one frequency being below the relaxation frequency of the viscous fluid, suppressing said compression mode vibration, receiving selected ultrasonic waves with a piezoelectric crystal in upstream-downstream transducers of said flowmeter, the selected upstream-downstream ultrasonic waves having a frequency being below the relaxation frequency of the viscous fluid corresponding to the radial vibration mode, and determining flow rate from said received selected frequency.

4. The method of claim 3 wherein said two spaced-apart frequencies are generated from the same crystal.

5. The method of claim 3 wherein both of said frequencies are below the relaxation frequency of the viscous fluid.

6. The method of claim 5 further defined by filtering one of said frequencies.

7. A transducer for an ultrasonic flowmeter of the upstream-downstream type comprising, a hollow tubular housing closed at a first end, the housing having a central lengthwise axis, and a piezoelectric crystal having opposed major sides, with first and second acoustic impedance loading members joined to said opposed major sides of the crystal forming a sandwich, wherein one of said loading members has a thickness of approximately one-half of a wavelength of said radial mode vibration and the other of said loading members has a thickness of approximately one-quarter of the same wavelength, the loading members having dimensions forcing radial mode vibration from the crystal, said sandwich disposed against said first end, with the major sides of the crystal disposed generally perpendicular to the axis of the housing.

8. An ultrasonic flowmeter comprising, a pair of transducers in an upstream-downstream configuration transverse to a pipe carrying a viscous fluid, each transducer having a hollow tubular housing closed at a first end, the housing having a central lengthwise axis, and a piezoelectric crystal having opposed major sides, with first and second acoustic impedance loading members joined to said opposed major sides of the crystal forming a sandwich, the loading members having dimensions enhancing radial mode vibration from the crystal while suppressing compressional mode vibration, the radial mode having a substantially lower frequency than the compressional mode, said sandwich disposed against said first end, with the major sides of the crystal disposed generally perpendicular to the axis of the housing, whereby low frequency radial mode vibration is a measurement frequency.

9. An ultrasonic flowmeter comprising, a pair of transducers in an upstream-downstream configuration transverse to a pipe carrying a viscous fluid, each transducer having a hollow tubular housing closed at a first end, the housing having a central lengthwise axis, and a piezoelectric crystal having opposed major sides, with first and second acoustic impedance loading members joined to said opposed major sides of the crystal forming a sandwich, the loading members having dimensions enhancing radial mode vibration from the crystal while suppressing compressional mode vibration, the radial mode having a substantially lower frequency than the compressional mode, said sandwich disposed against said first end, with the major sides of the crystal disposed generally perpendicular to the axis of the housing, the pipe having heating coil means surrounding the pipe for raising the temperature of the viscous fluid for acoustic energy transfer between the transducers.

* * * * *